Figure 1:
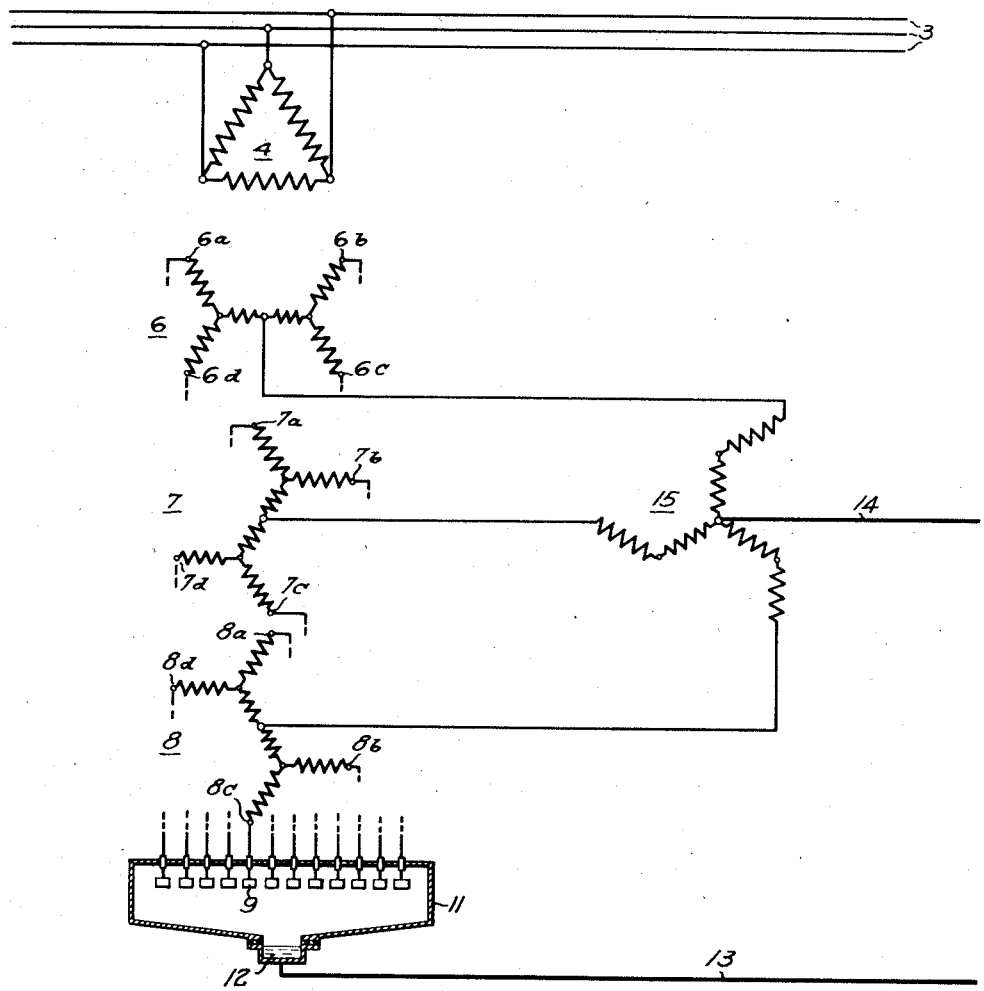

Nov. 26, 1935.  H. MEYER-DELIUS  2,022,341

ELECTRIC CURRENT RECTIFYING SYSTEM

Filed Nov. 30, 1932

Inventor
H. Meyer-Delius
by
Attorney

Patented Nov. 26, 1935

2,022,341

UNITED STATES PATENT OFFICE 2,022,341

ELECTRIC CURRENT RECTIFYING SYSTEM

Heinrich Meyer-Delius, Heidelberg-Schlierbach, Germany, assignor to Aktiengesellschaft Brown Boveri & Cie., Baden, Switzerland, a joint-stock company of Switzerland Application November 30, 1932, Serial No. 645,034
In Switzerland November 30, 1931

13 Claims. (Cl. 175—363)

This invention relates to improvements in electric current rectifying systems and more particularly to means for supplying a polyphase rectifier of the electron discharge type or a group of single phase rectifiers of such type with currents of a number of phases greater than the number of phases of the alternating current supply line.

Rectifiers of the different types known in the art, and more particularly rectifiers of the gaseous or of the metallic vapor arcing type, are most frequently supplied from three-phase alternating current supply lines with which they are connected by means of suitable transformers. To obtain a suitable output voltage regulation in such a system and to reduce the voltage ripple in the direct current output circuit thereof, the number of phases of the transformer secondary winding is usually increased from three to six by the connection of intermediate points of the several winding portions thereof to form a common neutral point, such connection being frequently obtained through a so-called interphase transformer. The number of transformer secondary phases is also frequently increased to a number greater than six by the use of additional transformer secondary windings or by suitable interconnection of portions of the secondary winding which is then provided with taps to permit such interconnection. In particular, the secondary winding of the transformer may consist of two six-phase systems displaced with respect to each other by 30 electrical degrees and either directly interconnected or connected through an interphase transformer to constitute a 12-phase system of connections. Such construction of the secondary winding of the transformer presents the disadvantage that, when the voltages of the three-phase supply line are unbalanced in magnitude or when such voltages present harmonics of the fundamental wave, the secondary voltages of the transformer are no longer of identical magnitudes with the result that the several anodes of the rectifier are unevenly loaded and that the direct current output voltage has a pronounced harmonic ripple. Another disadvantage of such a system resides in the fact that the current drawn from the line by the system is not sinusoidal but presents a number of harmonics of which the fifth and the seventh are the largest and therefore the most objectionable.

It has been found by research that, when the secondary winding of the transformer is formed by three symmetrical four-phase portions, the current distribution between the anodes of the rectifier is not affected by any unbalance in the primary voltages or by the presence of harmonics therein. It has also been found that, in such a system, the harmonics in the current drawn from the alternating current line are considerably reduced and in particular that the fifth and seventh harmonics are entirely absent in such currents. The secondary winding portions may preferably be interconnected by an interphase transformer to lengthen the period of operation of each anode during each cycle of the alternating current supply line.

It is, accordingly, one object of the present invention to provide a rectifying system insuring a uniform distribution of the current between the several anodes of the rectifier.

Another object of the present inventon is to provide a rectifying system in which the current distribution between anodes of the rectifier is not affected by unbalances in the voltages of the supply line.

Another object of the invention is to provide a rectifying system in which the current distribution between anodes of the rectifier is not affected by the presence of harmonics in the voltages of the supply line.

Another object of the present invention is to provide a twelve phase rectifying system in which the currents drawn from a three-phase alternating current supply line do not have either fifth or seventh harmonics.

Another object of the present invention is to provide a twelve phase rectifying system comprising a transformer having a three-phase primary winding and a twelve phase secondary winding divided into three symmetrical four-phase portions.

Another object of the present invention is to provide a twelve phase rectifying system comprising a transformer having a secondary winding subdivided into three portions connected with the output line through an interphase transformer.

Objects and advantages other than those above set forth will be apparent from the following description when read in connection with the accompanying drawing, in which:

Fig. 1 diagrammatically illustrates one embodiment of the present invention consisting of a twelve phase rectifying system employing an electric current rectifier of the metallic vapor arcing type, a transformer having a three-phase primary winding and a twelve phase secondary winding subdivided into three symmetric four-phase portions, and an interphase transformer.

Figure 2:
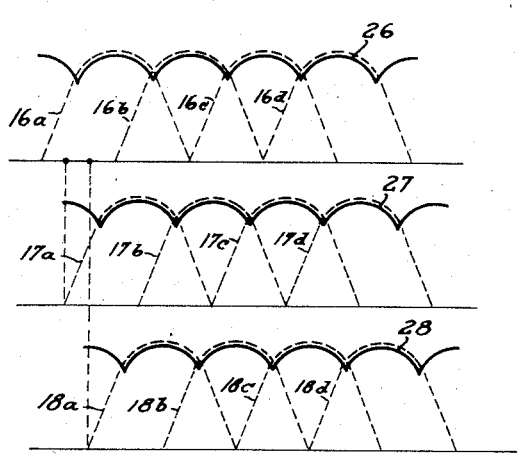

Fig. 2 is a diagram of the no load voltages of the secondary windings of the transformer utilized in the embodiment illustrated in Fig. 1.

Referring more particularly to the drawing by characters of reference, reference numeral 3 designates a three-phase alternating current supply line supplying current to the system. The rectifying system includes a transformer having a primary winding 4 herein illustrated as being connected in delta and receiving current from line 3. The transformer secondary winding comprises three symmetric four-phase portions 6, 7 and 8 each comprising six winding portions connected as shown in the drawing and receiving, by induction from winding 4, voltages such as to obtain four-phase alternating current voltages at the terminals thereof. The terminals of windings 6, 7, and 8 are severally connected with the anodes 9 of rectifier 11 shown as being of the metallic vapor arcing type having a cathode 12 of vaporizable material such as mercury connected with one of the conductors 13 of the direct current output circuit.

The neutral points of windings 6, 7 and 8 are severally connected with the terminals of a three-phase interphase transformer 15 having the windings thereof arranged on a common core and presenting a neutral point connected with the second conductor 14 of the direct current output circuit. Interphase transformer 15 is herein shown as being connected in zigzag because a star connection thereof would cause the production of direct magnetic flux in the core thereof as is well known in the art.

It will be understood that rectifier 11 may be replaced by a plurality of single phase rectifiers of a similar type having their anodes severally connected with the terminals of windings 6, 7 and 8 and their cathodes connected in common with conductor 13. Rectifier 11 may also be replaced by a polyphase rectifier or by a plurality of single phase rectifiers of the high vacuum type, thereby, however, introducing the well known limitations of rectifiers of such character into the system. Rectifier 11 may also be replaced by a plurality of single phase rectifiers of the contact type such as the well known copper oxide rectifiers.

In operation, assuming that winding 4 is energized from line 3, each secondary winding portion such as 6 presents, at the terminals thereof, symmetric four-phase voltages, the connections of the windings being such that voltages in portion 6 are displaced by 30 electrical degrees with respect to the voltages in portion 7 and the voltages in portion 7 are also displaced by 30 electrical degrees with respect to the voltages in portion 8, so that the terminal voltages of the entire secondary winding constitute a twelve phase system of voltages. Due to the presence of interphase transformer 15, each secondary winding portion such as 6 operates as an independent source of supply for the associated anodes of rectifier 11. Assuming that an arc is ignited and is being maintained in rectifier 11 by the usual means (not shown), the anodes connected with the terminals of winding 6 receive current sequentially during each cycle of the supply line voltage, each anode therefore operating over a period of one-quarter of a cycle. The terminal voltages of winding portions 6a, 6b, 6c and 6d are shown in Fig. 2 at 16a, 16b, 16c and 16d, the corresponding anodes carrying current during the peak portion of each curve. The voltages present between the neutral point of winding 6 and cathode 12 of rectifier 11 are then represented by curve 26 which lies below the peaks of curves 16a to 16d by the amount of the arc drop in rectifier 11. Similarly the terminal voltages of winding portions 7 and 8 are represented by curves 17a to 17d and 18a to 18d, and the voltages between the neutral points of winding portions 7 and 8 and cathode 12 are represented by curves 27 and 28 respectively.

Due to the action of the interphase transformer 15, the output voltage of the system applied to conductors 13 and 14 is equal to the average of the voltages represented by curves 26, 27 and 28, the difference between such average and the voltages shown by the curves appearing at the terminals of interphase transformer 15. Such transformer, therefore, presents three-phase voltages of a frequency higher than that of the alternating current supply line, but which do not appear in either the supply line or in the output circuit. It will be understood that curves 26, 27 and 28 are accurate only when the system is not carrying any load and will be somewhat distorted under load conditions due to the inductive drop of load currents in the transformer windings. As will appear from Fig. 2, current is carried simultaneously at every instant by three anodes of rectifier 11 each connected with one of the secondary winding portions 6, 7 and 8, thereby insuring a high degree of utilization of the rectifier and of the transformer.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a system of the character described, a transformer comprising a secondary winding divided into three four phase systems, and each phase of each system comprising a plurality of winding sections displaced 120° relative to each other.

2. In a system of the character described, in combination, a transformer comprising a secondary winding divided into three portions of four phases each and each phase of each portion comprising a plurality of sections displaced 120° from each other and connected to form a neutral point, and an interphase transformer having winding portions severally connected with said neutral points and having connections forming a neutral point.

3. In a system of the character described, a transformer comprising a secondary winding divided into three four phase portions formed of three midtapped sections displaced 120° from each other and connected at each end thereof to two other sections displaced 120° one from another whereby each said portion provides four phases displaced 90° one from another, and an interphase transformer having winding portions severally connected with said midtapped points and having connections forming a neutral point.

4. In combination with a polyphase alternating current circuit, a direct current circuit, and electric current converting means comprising a cathode connected with said direct current circuit and a plurality of anodes, of a transformer connected with said alternating current circuit and having a winding divided into three similar symmetrically arranged portions of four phases each and each said phase comprising a plurality of sections displaced 120° from each other and severally connected with said anodes and having connections forming a neutral point connection with said direct current circuit, the number of phases and the symmetrical arrangement of said portions being such as to prevent differences in the magnitude of the alternating current circuit voltages from affecting the current distribution in said portions of said winding.

5. In combination with a polyphase alternating current supply circuit, a direct current work circuit, and electric current rectifying means comprising a cathode connected with said work circuit and a plurality of anodes, of a transformer having a primary winding connected with said alternating current circuit and a secondary winding divided into three similar symmetrically arranged phase displaced portions, each comprising a plurality of phase displaced sections severally connected with said anodes and having connections forming a neutral point connection with said direct current circuit, the number of phases and the symmetrical arrangement of said portions being such as to prevent current of frequencies corresponding to the fifth and seventh harmonic frequencies of the supply circuit from flowing thereto from said primary winding.

6. In combination with a polyphase alternating current circuit, a direct current circuit, and electric current converting means comprising a cathode connected with said direct current circuit and a plurality of anodes, of a transformer connected with said alternating current circuit and having a winding divided into three similar symmetrically arranged phase displaced portions each comprising a plurality of phase displaced sections severally connected with said anodes and having connections forming a neutral point connection with said direct current circuit, the number of phase displaced sections and the symmetrical arrangement of said portions being such as to prevent harmonic components of the voltages of said alternating current circuit from affecting the current distribution in said portions of said winding.

7. In combination with a polyphase alternating current circuit, a direct current circuit, and electric current converting means comprising a cathode connected with said direct current circuit and a plurality of anodes, of a transformer connected with said alternating current circuit and having a winding divided into three similar symmetrically arranged phase displaced portions, each comprising a plurality of phase displaced sections severally connected with said anodes and having connections forming a neutral point connection with said direct current circuit, the number of phases and the symmetrical arrangement of said portions being such as to prevent differences in the magnitude and harmonic components of the alternating current circuit voltages from affecting the current distribution in said portions of said winding.

8. In combination with a polyphase alternating current supply circuit, a direct current work circuit, and electric current rectifying means comprising a cathode connected with said work circuit and a plurality of anodes, of a transformer having a primary winding connected with said circuit and a secondary winding divided into three similar symmetrically arranged phase displaced portions, each comprising four phase displaced sections severally connected with said anodes and having connections forming a neutral point connection with said work circuit, the number of phase displaced sections and the symmetrical arrangement of said portions of said secondary winding being operable to prevent harmonic components of the supply line voltages from affecting the current distribution in said portions and to prevent current of frequencies corresponding to the fifth and seventh harmonic frequencies of the supply circuit from flowing thereinto from said primary winding.

9. In combination with a polyphase alternating current circuit, a direct current circuit, and electric current converting means comprising a cathode connected with said direct current circuit and a plurality of anodes, of a transformer connected with said alternating current circuit and having a winding divided into three similar symmetrically arranged phase displaced portions, each comprising four phase displaced sections severally connected with said anodes and having connections forming a neutral point, and an interphase transformer having a winding divided into three portions severally connected with said neutral points and connected to form a neutral point connection with said direct current circuit, the number of phase displaced sections and the symmetrical arrangement of said portions being operable to prevent harmonic components of the alternating current line voltages and unbalance thereof from affecting the current distribution in said portions of said winding, and the said interphase transformer being operable to prolong the recurrent periods of flow of current through said anodes by way of said winding sections.

10. In combination with a polyphase alternating current circuit, a direct current circuit, and an electric current converting means comprising a cathode connected with said direct current circuit and a plurality of anodes, of a transformer having a primary winding connected with said alternating current circuit and having a winding divided into three similar symmetrically arranged phase displaced portions formed of three phase midtapped sections connected at each end thereof to two other sections displaced 120° and severally connected with said anodes to form four phases displaced 90° one from another, and an interphase transformer having a winding divided into three portions severally connected with said midtapped points and having connections forming a neutral point connection with said direct current circuit, the said interphase transformer being operable to prolong the recurrent periods of flow of current through the respective anodes and said connected sections, and the number of phases and symmetrical arrangement of said portions being operable to prevent harmonic components and unbalance in magnitude of the voltages of the said alternating current circuit from affecting the current distribution in said portions of the first said transformer and to prevent current of frequencies corresponding to the fifth and seventh harmonic frequencies of said alternating current circuit from flowing thereinto from said primary winding.

11. In a system of the character described, a transformer comprising a secondary winding divided into three four phase portions, each formed of three midtapped sections displaced 120° one from another and connected at each end thereof to two other sections displaced 120° one from another, whereby each said portion provides four phases displaced 90° one from another.

12. In a system of the character described, a transformer comprising a secondary winding divided into three four phase displaced portions to form a twelve phase system, the said phases severally comprising two phase displaced winding sections so proportioned that one section thereof contains substantially two and seventy-two one hundredths times the number of turns as the other section thereof.

13. In combination with a polyphase alternating current supply circuit, a direct current work circuit, and electric current rectifying means comprising a cathode connected with said work circuit and a plurality of anodes, of a transformer having a primary winding connected with said supply circuit and a secondary winding divided into three similar symmetrically arranged phase displaced portions each comprising a plurality of phase displaced sections severally connected with said anodes and having connections forming a neutral point connection with said direct current circuit, the number of phases and the symmetrical arrangement of said portions being such as to prevent the creation in the voltage impressed on said work circuit from said rectifying means of components corresponding in frequency to the sixth harmonic frequency of said supply circuit and odd multiples of such said harmonic frequency.

HEINRICH MEYER-DELIUS.